United States Patent [19]
Greco

[11] Patent Number: 5,288,839
[45] Date of Patent: Feb. 22, 1994

[54] DIOL-TERMINATED POLYCARBONATES

[75] Inventor: Alberto Greco, Dresano, Italy

[73] Assignee: Enichem Synthesis S.p.A., Palermo, Italy

[21] Appl. No.: 944,908

[22] Filed: Sep. 15, 1992

[30] Foreign Application Priority Data

Sep. 17, 1991 [IT]  Italy .......................... MI91 A 002457

[51] Int. Cl.$^5$ .............................................. C08G 64/00
[52] U.S. Cl. ..................................... 528/204; 528/196; 528/202
[58] Field of Search ........................ 528/204, 202, 196

[56] References Cited

U.S. PATENT DOCUMENTS

| | | | |
|---|---|---|---|
| 4,533,729 | 8/1985 | Newland et al. | 528/371 |
| 4,686,273 | 8/1987 | Harris | 528/196 |
| 4,686,274 | 8/1987 | Harris et al. | 528/196 |
| 4,808,691 | 2/1989 | Konig et al. | 528/76 |
| 5,116,929 | 5/1992 | Greco et al. | 528/44 |
| 5,133,742 | 7/1992 | Pinchuk | 623/1 |
| 5,137,935 | 8/1992 | Bott et al. | 521/172 |

FOREIGN PATENT DOCUMENTS

| | | |
|---|---|---|
| 007265 | 1/1980 | European Pat. Off. |
| 0292772 | 11/1988 | European Pat. Off. |
| 0310704 | 4/1989 | European Pat. Off. |
| 0442402 | 8/1991 | European Pat. Off. |
| 0461375 | 12/1991 | European Pat. Off. |

*Primary Examiner*—John Kight, III
*Assistant Examiner*—P. Hampton-Hightower
*Attorney, Agent, or Firm*—Oblon, Spivak, McClelland, Maier & Neustadt

[57] ABSTRACT

Diol-polycarbonates having the general formula

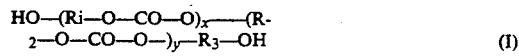

$$HO-(R_1-O-CO-O)_x-(R_2-O-CO-O)_y-R_3-OH \qquad (I)$$

where $R_1$, $R_2$, $R_3$, X and Y have the meaning specified in the text, are used in the synthesis of prepolymers which in turn can be used in reactive adhesive and/or sealing formulations of the hygro-, photo- or thermosetting type, and the procedure for their preparation. The sealing compositions deriving from these diolterminated-polycarbonates are mainly used in transport industry, in the textile and wood industry, for cellular products and in the bookbinding industry.

11 Claims, No Drawings

DIOL-TERMINATED POLYCARBONATES

The present invention relates to new diolterminated polycarbonates, their use in the synthesis of prepolymers which in turn are used in reactive adhesive and/or sealing formulations of the hygro-, photo-or thermo-setting type and the procedure for their preparation.

Sealing and/or adhesive compositions obtained from the diolterminated polycarbonates of the present invention, are mainly used in the fields of transport vehicles, bookbinding, textile and wood industries and cellular products.

Reactive and hygrosetting adhesives based on prepolymers obtained by the reaction of diolterminated polyesters, particularly of a diolterminated polyadipate, with a diisocyanate, are already known in the art. These prepolymers, having free —NCO groups at the chain ends, are described in Patent Applications DE 401820, EP 107097 and DE 3827224.

Owing to their crystalline nature, these prepolymers can be easily melted at over 80° C. and applied in a liquid form; the subsequent rapid recrystallization ensures a very low set-time of the adhesive. These adhesives are also called hot-melt because of the above characteristic.

The chain extension of the reactive prepolymer applied in this way, takes place through the action of environmental humidity which reacts with NCO groups of the prepolymer hydrolizing them with the formation of $NH_2$ groups and discharge of carbon dioxide; the newly formed $NH_2$ groups react in turn with other non-hydrolized NCO groups to form ureic bridges between the various chains.

The reaction scheme is the following:

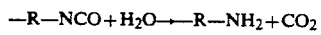

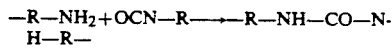

where R represents the terminated NCO polyester chain.

Crystalline polyesters with a high crystallization rate have the disadvantage however that the crystallization following their application causes a considerable shrinkage of the material changing its physical state, which can substantially prejudice their adhesion.

Another disadvantage stems from the fact that crystalline polymers with a high crystallization rate have a limited initial tack before cross-linking. A means of obviating either one or both of these drawbacks is to mix the crystalline polyester with one or more polyester of the fluid and/or vitreous type. Amorphous polyesters mixed with the crystalline type reduce shrinkage in the crystalline phase and can, especially the vitreous types, increase the initial tack. This principle is illustrated in Italian Patent Application 22653A88, filed in the name of the same Applicant, which describes reactive polyurethane prepolymers obtained from glycols combined with an elastomeric polycarbonate or copolyester polycarbonate and, optionally, a polyol of the vitreous type.

Even though the principle of mixing two or more polyurethane prepolymers of the reactive type solves some of the problems linked to the initial tack and adhesion, there are several draw-backs as regards synthesis.

In particular considerable experimental work is required to adjust the proportions of the various reactive polymers in the mixture and to ensure maximum adhesion to each single substrate.

There was consequently a highly-felt necessity of finding prepolymers containing the above characteristics such as high reactivity and hydrolytic resistance together with limited shrinkage during chain extension, without resorting to mixing with other polymers, which is necessary with the polymers of the known art.

The purpose of the present invention is therefore to overcome the above-mentioned disadvantages of the known art.

In accordance with the present invention, this and other objectives which will be illustrated in the following description, are obtained by the diolterminated polycarbonates having the general formula (I)

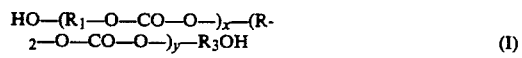
(I)

wherein:
the succession of radicals $R_1$—O—CO—O— and $R_2$—O—CO—O— inside the copolymer is of the purely random type, $R_1$ is a linear alkylene radical deriving from a HO—$R_1$—OH diol by the loss of two hydroxyls and containing from 8 to 14 carbon atoms, $R_2$, different from $R_1$, is a bivalent radical selected from:
a) linear or branched alkylene radicals or cycloalkylene radicals, containing from 2 to 14 carbon atoms;
b) bivalent radicals deriving from diglycol terminated polyethers by the loss of the two hydroxyls;
c) the bivalent radical

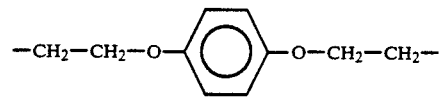

and/or derivatives of di- and polyethoxylates of phenolic compounds;
d) the bivalent radical

deriving from the condensation of a lactone with a linear glycolaliphatic where m is a number between 3 and 5 whereas n is a number from 4 to 14, or
e) a mixture of 2 or more bivalent radicals among those listed in paragraphs a), b), c) and d),
$R_3$ is a bivalent radical equal to $R_1$ or $R_2$, and x and y have such values that:
a) the fraction of the structural units corresponding to —($R_1$OCO—O)$_x$— represents from 50 to 954 by weight of the whole copolymer,
b) the molecular weight (KW) of the polycarbonate diol having general formula (I) must be from 1,500 to 15,000.

In accordance with a preferred aspect of the present invention $R_1$ represents a polymethylene radical containing from 9 to 12 carbon atoms; $R_2$ preferentially represents one or more bivalent radicals deriving from the following diols by the loss of the two hydroxyls: 1,4-butandiol, 2,2-dimethyl-1,3-propandiol, 1,5-pentadiol, 1,6-hexandiol, 1,4-bishydroxy-methylcyclohexane, triethylenglycol or the diol deriving from the condensation of the caprolactone with 1,6-hexandiol; and the molecular weight of the polycarbonate diol having general formula I is between 2000 and 8000.

The polycarbonate diols of the present invention are characterized in that they have preferably crystallization temperatures ($T_c$) ranging from +20° to 45° C., a melting point ($T_m$) of between +40° and +70° C. and a $C_8$-$C_{14}$ linear alpha-omega-diol content (i.e. that corresponding to the radical $R$,) of between 50 and 95% by weight (35-954 in moles), a hydroxyl-functionality ($F_{OH}$) of 2.

They have a high crystallization rate, good rheological characteristics, a low glass transition temperature ($T_g$) and a high hydrolytic stability; with these characteristics they can be conveniently used in the production of adhesives or seals of the hot melt type.

The ($T_g$) generally ranges from −40° C. to −60° C.; the enthalpies of crystallization range from 50 to 110 J/g as determined by DSC. Their degree of crystallization is moreover so controlled that these carbonates when used in the preparation of diisocyanate terminated reactive prepolymers, are capable of giving, even alone, the characteristics of a reactive, hygrosetting type hot melt to the adhesive compositions prepared from them.

In fact the use of synthesizable diisocyano-terminated prepolymers starting from the polycarbonate diols of the present invention by reaction with aliphatic and/or aromatic diisocyanates, allows hot-melt adhesive and sealing compositions to be obtained, having a high crystallization rate with a high initial set and adhesion without resorting to the complicated mixtures of prepolymers of the known art.

The use of the polycarbonate diols in question is therefore mainly directed towards the field of formulations of adhesives and sealants of the hot-melt type, having reactive-type terminations, characterized by the absence of solvents; particularly in those formulations where it is necessary to overcome the problems commonly arising with crystalline polyesters of the linear aliphatic type, and in particular the polyadipates previously mentioned, which are intrinsically extremely vulnerable to hydrolytic attack and are at present used in this specific field.

For this purpose, it is necessary to convert the hydroxylic functionality of the polycarbonate diols into a reactive-type functionality such as that constituted for example by a isocyanate group, to obtain reactive, hygrosetting prepolymers having the exceptional properties mentioned before.

The excellent qualities of the polycarbonate diols of the present invention also allow the production of adhesive resins of the photo- and thermo-setting type. In fact, the present invention also relates to the use of polycarbonate diols having general formula (I) in the synthesis of prepolymers wherein the reactive terminal groups, rather than the isocyanate groups, mentioned above, are siliconalkoxy groups or (meth-) acrylic groups.

In the first case adhesives of the hygrosetting type are obtained, whereas in the second case, adhesives of the photo or thermosetting type are obtained.

The reactions which enable these prepolymers to be obtained are the conventional ones well-known to experts in the art.

However, independently of the cross-linking mechanism, the excellent capacity of hydrolytic and thermal resistance of the polycarbonate structures is transmitted to the adhesives, especially when compared to that of the polyesters and polyethers traditionally used in the field.

The application of the diol-terminated polycarbonates of the present invention in the field of hot-melt reagents is extremely useful for improving the long-term performance of polyesters, even when they are used in a high proportion (up to 504 by weight) in the construction of hot-melt adhesives of the reactive type combined with the polycarbonates claimed herein.

The diol-terminated polycarbonates having general formula (I) are obtained with one of the known techniques for the production of polycarbonates, such as the method involving the reaction of glycols with phosgene or the transesterification of glycols with an alkyl-, alkenyl-, alkylene- or aryl-carbonate in the presence or without suitable catalysts. Transesterification offers the advantage of being able to be carried out at rather moderate temperatures (+80°-240° C.) and without solvents and allows products to be obtained with a hydroxylic functionality very close to the theoretical value.

Following the transesterification technique an organic carbonate, such as a dialkylcarbonate, a dialkenylcarbonate, a cycloalkylencarbonate, a diarylcarbonate, is reacted with the mixture of HO—$R_1$—OH and HO—$R_2$—OH diols where $R_1$ and $R_2$ have the meaning previously specified.

The transesterification is normally carried out with a molar ratio diols/organic carbonate ranging from 1.03 to 1.3, at a temperature of about 80° to about 240° C., for a period of about 4 to about 10 hours, eliminating the alcohol, the glycol or the phenol which are formed as reaction by-products.

When the organic carbonate is of the aliphatic type, it is necessary to use a transesterification catalyst, preferably of an alkaline nature, for example an alkaline alcoholate, such as sodium methylate.

At the end of the reaction the catalyst is eliminated using the known techniques, such as, for example, neutralization of the alkaline alcoholate with an organic or inorganic acid which is used in a stoichiometric quantity with respect to the sodium methylate.

The polycarbonates of the present invention once liberated from the catalytic residues can be easily Converted into telechelic polymers having a relatively low molecular weight and reactive terminal functionality of the hygro, photo or thermo-setting type, which can be used in reactive, hot-melt compositions or alternatively, for the production of polyurethanes or polyurethanes-polyureas to give hot-melts used in solvents indispersable in aqueous emulsions.

One of the typical methods for the conversion of the hydroxylic functionality into the isocyanate group for the construction of hot melts of the hygrosetting type starting from polyesters is that described by Huber & Muller, Adhesives Age, November 1987.

The use of the polycarbonates of the present invention instead of polyadipates in the same formulations enables excellent results to be obtained in terms of hydrolytic resistance; this resistance is maintained even when the polycarbonate is used in hot-melt compositions which include, even in a relevant proportion, a polyester (up to 50% by weight).

The replacement of the hydroxylic function with reactive silanic groups, having structures —Si$X_xY_{3-n}$ where X=methyl Y is a hydrolizable group, preferably —O—$CH_3$ and n is an integer equal to 0 or 1, allows polycarbonates to be obtained which are capable of cross-linking according to the typical mechanisms of the silicons.

The adhesive composition of the hygrosetting, reactive hot-melt type containing alkoxysilanic groups mentioned beforehand can be easily obtained by coupling with diisocyanates to give NCO terminated prepolymers, which are subsequently reacted with N-alkylgamma-aminoalkylenalkoxy-silanes, in particular with products having the structure

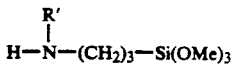

as described for example by Huber Muller in "Guidelines for the formulation of reactive hot melts and adhesives", Munich 20-22 October, Seminar on adhesives and coatings.

Also in this case, the substitution of polyadipates, and polyesters in general, enables the production of adhesive compositions with special substrates such as glass and cement with improved aging resistance and extremely good mechanical properties, in particular elasticity and flexibility at low temperatures; the elasticity is particularly good owing to the combination of urethane with silicon. The N-alkylgamma-aminoalkylen-alkoxysilanes can also be easily obtained by the hydrosililation reaction with alkoxysilanes of N-alkyl alkylenamines, but also by Michael reaction which is preferable, by the reaction of acrylates or methacrylates with aminoalkylene alkoxysilanes. In the latter case R' having the above formula corresponds to the group

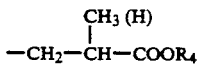

($R_4 = CH_3$, $C_2H_5$ etc).

Also modifications of the polycarbonates to products with an acrylate type termination can be obtained by coupling with diisocyanates, preferably of the aliphatic type, and subsequent reaction with hydroxyalkylacrylates and methacrylates as specified for example in Patent DE 3.613.082. Hot-melt adhesives formed in this way can be easily activated by a photochemical or thermal process, giving adhesion under conditions which exclude environmental humidity and which cross-link very rapidly, obviously after incorporation in the products of photo or thermoinitiators, i.e. substances capable of generating radicals under the impulse of light or heat.

Also in this case the hot melts have excellent mechanical properties, flexibility at low temperatures, as well as thermal and hydrolytic stability, due to the presence of the polycarbonate claimed in this patent.

It should be noted that the reactive adhesives and/or sealants obtained from the diol-terminated polycarbonates of the present invention can either be used on their own or formulated with charges and additives suitable for increasing the stability, or Stickiness or also, as in the case of catalysts, the cross-linking rate.

The additives should obviously not be of the kind which would destabilize the functionalized prepolymers during short or long-term storage.

Inorganic fillers may also be introduced into the formulations, such as amorphous $SiO_2$, glass powder, talc, calcium carbonate etc., or organic fillers and particularly resins suitable for promoting adhesion but at the same time without prejudicing the pot stability of the prepolymers; terpenphenolic resins, carboxylated or maleic-reacted styrene resins may by mentioned.

The formulations may also include substances suitable for promoting adhesion, in particular functionalized alkoxysilanes (gamma-glycidyloxypropyltrimethoxysilane, gamma-mercapto-propyltrimethoxysilane, methacryloylpropyltrimethoxysilane etc.).

However we would like to point out that although the formulations may such as to solve specific problems, the adhesives claimed herein nevertheless function satisfactorily and are able to adhere to most of the conventional substrates, with an exceptional performance of hydrolytic resistance after being cross-linked on the substrate by the action of humidity, in case of prepolymers terminated with —NCO or —$S_iX_nY_{3-n}$, by photochemical or thermal action in the case of those terminated with acrylic functions according to what has been previously described.

The following examples illustrate the properties of the polycarbonate diols claimed herein in terms of physical properties and also their capacity to be used as interesting intermediates for reactive hot-melt formulations of the hygro-photo- and thermo-setting type in substitution of or combined with the traditional polyesters; the hydrolytic stability of the latter may be significantly reduced by mixing with our products.

EXAMPLES 1-8

General conditions for the preparation of a copolymeric polycarbonate diol.

1,12-dodecandiol (g 910.5, 4.5 moles), 1,6 hexandiol (9 649, 5.5 moles) and sodium methylate (30% by weight in $CH_3OH$; ml 1) are charged into a three liter flask equipped with a thermometer, mechanical stirrer, a rectifying column with 10 plates, and drip funnel.

The temperature of the contents of the flask is brought to $+150°$ C. by means of an external oil-bath and dimethylcarbonate (DMC) (g 1084, 12.04 moles) is introduced through the drip funnel at such a rate as to maintain the temperature of the reagents at $+150°$ C.

At a temperature of $+150°$ C. the azeotropic mixture methanol/DMC (for ex. 64° C.) is collected, and the collection rate serves as a guide for the addition of the DMC.

When the DMC has been added the internal temperature of the reagents is progressively raised to 195° C. and the majority of the azeotropic mixture is collected by distillation at normal pressure (about 4 hours). The final part of the reaction is carried out first at reduced pressure (100 torr) and then under maximum vacuum (<1 torr). Under these conditions hexandiol (g 130.4) which is continually stripped from the reaction environment is distilled until the product has reached the correct OH value (about 3 hours).

The distilled azeotropic mixture amounts to g 816.3.

The polycarbonate diol is then purified from the catalyst by aqueous washing and again reanhydrified by drying under vacuum at $+120°$ C.

The polycarbonate copolymer of 1,12-dodecandiol has the characteristics of Ex. 1 in Table 1.

The copolymeric polycarbonates of Examples 2-6 and homopolymeric polycarbonates of Example 7 and 8, whose characteristics are shown together with those of the others in Table 1, were prepared in the same way. In these examples the feeding of the diols was respectively: Ex. 2 1-12 dodecandiol (g 910.5, 4.5 moles), 1-6 hexandiol (g 649, 5.5 moles), DNC (g 1106, 12.28 moles). Ex.3 and Ex.4, decandiol (g 700.0, 4.01 moles), hexandiol (9 210, 1.766 moles), DMC (639.8 g, 7.10 moles). Ex.5, nonandiol (g 1000; 6.24 moles), hexandiol (g 136.36; 1.55 moles), DMC (g 625.9; 6.948 moles). Examples 7 and 8 were included as a comparison, the polycarbonate diol homopolymers representing the polycarbonates deriving from 1.12 dodecandiol and 1:10 decandiol respectively.

EXAMPLES 9-14

The coupling of the polymers referred to in Table 1 with aromatic diisocyanate (diphenylmethanodiisocyanate; (MDI)] was carried out as described as follows for the polyol of Example 2 in Table 1 and in the same way for all the other polyols.

The diol-terminated polycarbonate of Example 2 in Table 1 (g 96.25, 30.82 moles, meq OH 61.66) is introduced into a 4-necked flask equipped with a mechanical stirrer, nitrogen inlet, thermometer and drip-funnel. 10 mg of parachlorobenzoylchloride are added and the mixture is brought to melting point at a temperature of +100° C. of an external bath.

16.7 g of MDI (67.825 mmoles, meq NCO 135.85) are added through the drip-funnel as rapidly as possible, under stirring and at a temperature of 100° C. A slight thermal deviation of 2°-3° C. is noted.

The stirring is continued for 2 hours at +100° C.; after this period analysis reveals that 47% of the NCO groups have disappeared. The product is then cooled and its contents transferred to a bottle in an dry and inert atmosphere until further use.

The results relating to the MDI polyol coupling are shown in Table 2.

EXAMPLE 15

A commercial vitreous polyester of phthalic and isophthalic acid (Nn 5500, tg +35° C.; g 100, 18.48 mmoles) was also coupled with MDI (g 14.35, 58.18 mmoles) using the same procedure as the polycarbonate diols of Examples 9-14.

The coupling was carried out for 1 hour at +120° C. with a ratio NCO/OH of 3.2, after which titration revealed that 38% of the NCO group had disappeared. The characteristics of this diisocyanate-terminated polyester were the following:

viscosity (cps×10³, +110° C.) 900,000 tg (° C.)=+34.9

EXAMPLES 16-17

The prepolymers of Example 11 in Table 2 and that of Example 15 were mixed in dry nitrogen with mechanical stirrer at +120° C. and homogenized at the same temperature for 40', in the following proportions:

| Example Number | Prepolymer of ex. 11 (% by weight) | Prepolymer of ex. 15 (% by weight) |
|---|---|---|
| 16 | 65 | 35 |
| 17 | 50 | 50 |

After cooling the mixture of polymers was recovered from the flask. The two blends showed the following characteristics:

| Example Number | M.P. (°C.) | $T_c$ (°C.) | Viscosity at 110° C. (Cps 10³) |
|---|---|---|---|
| 16 | 44 | 21.7 | 83 |
| 17 | 43.3 | 22.3 | 122 |

EXAMPLES 18-25

Approximately 50 g of the NCO-terminated polymers of Examples 9-14 and 16-17 were melted in a laboratory flask in dry nitrogen at +100° C. and tin dibutyldilaurate (50 mg, 100 ppm) was added. After homogenizing for 40' the formulations obtained were moulded into 0.5 mm thick plates and hardened under controlled conditions of temperatures and humidity (+23° C., 50% relative humidity). The plates were cut and the tensile properties of the adhesive were determined on the test samples thus obtained, and are shown in Table 3.

The cross-linked adhesives of Table 3 were then immersed in deionized water for 30 and 60 days respectively at +65° C.

After this period the plates were extracted and brought back to environmental conditions (+22° C. and 50% relative humidity) and again submitted to a tensile stress test.

The results are shown in Table 4.

EXAMPLES 26-27

Two samples of commercial polyester having a hydroxylic functionality of 2, number average molecular weight Mn 2000 and 3600, $N_{OH}$ 55.3, and 31.2 were coupled with MDI (NCO/$_{OH}$=2.2) following the method used in Examples 9 and 14.

They were formulated with 100 ppm of tin dibutyldilaurate as described in Example 18-25 and moulded into 0.5 thick plates and evaluated as such and after hydrolytic aging under the conditions of the other adhesives. The results relating to the hydrolytic aging evaluations are shown in Table 4.

EXAMPLE 28

Preparation of aminosilane:

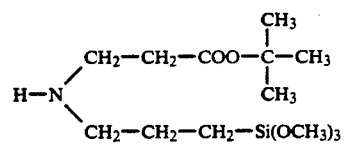

3 amino (N propenyl-3-trimethoxysilyl) propionic acid t-butylester.

3-aminopropyltrimethoxysilane (g 121.7, 0.679 moles) are charged into a flask equipped with a mechanical stirrer, thermometer and drip-funnel and operating in dry nitrogen. Terbutylacrylate (g 87.3, 0.679 moles) is fed from the drip-funnel at about 20° C. under stirring for about two hours, the temperature being maintained at +20°-25° C. during stirring. At the end of the addition the mixture is heated for two hours to +65° C. and is then left to rest overnight. Fractionated distillation of the liquid supplies the product with p.c. 129-33 at 0.1 Mm of Hg; g p.c. gives a 994 purity (g 156, 0.51 moles, yield 75%); the light portions amounted to g 33 and the heavy portions to g 18.

EXAMPLES 29-32

The example which is described is typical of a preparation which enables the conversion of a polycarbonate diol into a product with a siliconalkoxy type termination using the product (and similar) of Example 2.

The polycarbonate diol of Example 1 in Table 1 (g 110, 27.66 mmoles, meq 55.32) is placed in a 250 ml flask equipped with a steel-blade stirrer, thermometer and drip-funnel and is brought to melting point at 80° C. with 5 mg of parachlorobenzoylchloride (PBCT); the MDI in its molten state (g 15, 60.9 mmoles, meq 121.8) was rapidly added through the drip-funnel.

After quick homogenization (slightly exothermal), the reaction was continued at a temperature of $+110°$ C. for one hour. Titration of NCO groups on the product reveals that the reaction between OH of the polyol and MDI was practically complete; the temperature of the reactor was then brought to $+100°$ C. and the alkoxysilane of Example 28 (g 20.4, 66.4 mmoles, meq NH 66.4) was rapidly added.

After complete homogenization, sulphobenzoic anhydride in MEK (g 0.1 in 0.5 ml of MEK) was added at the same temperature and after mixing for 15-201 the polymeric mass was cooled.

The polymer was removed from the flask and transferred to a second sealed container in a dry nitrogen atmosphere. The product was characterized for viscosity and differential thermal analysis (DSC). The results obtained for three different polycarbonates (Examples 1, 5, 4 respectively) are shown in Table 5.

EXAMPLES 33-36

The reactive prepolymers of Examples 29-32, with $-Si(OMe)_3$ termination are cross-linked under controlled conditions of temperature and humidity ($+25°$ C., 50% relative humidity) after being moulded into 0.3 Mm thick plates. After one week they are submitted to the dynamo-mechanical test.

The results relating to this test are shown in Table 6.

EXAMPLE 37

Preparation of the adduct isophorondiisocyanate-hydroxyethylacrylate.

The adduct 1:1 on a molar base between hydroxyethylacrylate and isophorondiisocyanate was prepared with the purpose of introducing the acrylate function into the diol-terminated polycarbonates previously described, by means of coupling with aliphatic diisocyanate.

Isophoronediisocyanate (g 22.23, 0.1 moles), p.chlorobenzoylchloride (10 mg) were charged under a dry nitrogen atmosphere into a 150 ml flask equipped with a mechanical blade-stirrer, drip-funnel, thermometer and nitrogen inlet; hydroxyethylacrylate (11.6 g, 0.1 moles), phenothiazine (3 mg) and hydroquinonemonomethylether (10 mg) are added through the drip-funnel at $+50°$ C. and under stirring, for about thirty minutes. At the end of the addition tin dibutyldilaurate (5 mg) is added and the mixture is heated to $+65°$ C. until the band of hydroxyls disappears at the infra-red wave length. Title control of the free isocyanate on the product (sec.butylamine method) reveals that the reaction is perfected in about 8-10 hours.

EXAMPLE 38

The polycarbonate diol of Example 1 of Table 1 (g 110, mmoles 27.66, meq$_{OH}$ 55.32) was transferred to a small flask equipped with a stirrer, drip-funnel and thermometer, and then brought to melting point in a dry nitrogen atmosphere by heating with an external oil-bath, to a temperature of $+65°$ C. The adduct described in Example 37 (g 12.15, meq 35.95) was then added through the drip-funnel in a single amount.

After rapid homogenization tin dibutyldilaurate (50 mg) was added and the reaction was then continued at $+65°$ C. until infra-red spectroscopy (VNCO 2270 cm$^{-1}$) revealed that the band of isocyanate had completely disappeared, after about 4 hours.

N,N dimethylethanolamine (g 0.15), benzophenone (0.5 g) and Darocure 1173 (Ciba) (1.0 g) were then added to the product in its molten state.

The product was homogenized for 30' at $+65°$ C. and finally cooled and transferred into a container protected from the light; it had the following characteristics, which did not undergo modifications until 6 months of storage:

viscosity (Cps$\times 10^3$, $+80°$ C.) 75
$T_m$ (° C.) $+45.9$

| | |
|---|---|
| $T_c$ (°C.) | $+25$ |
| $\Delta H_c$ (J/g) | 58.8 |

EXAMPLE 39

Characterization of the formulate of Example 38.

The formulate of Example 38 was moulded at $+65°$ C. in a melting press between sheets of oil-paper having a thickness of 0.3 mm and submitted to cross-linking by means of a U.V. oven equipped with high pressure lamps with 8 passages at a rate of 15 m/sec. After conditioning for 48 hours to $+25°$ C. and 50% relative humidity the dynamo-mechanical test on the sample provided the following results:

| | |
|---|---|
| breaking load (Kg/cm$^2$) | 173 |
| modulus (100% of def.; Kg/cm$^2$) | 49 |
| modulus (200% of def.; Kg/cm$^2$) | 33.8 |
| deformation (%) | 538 |

TABLE 1

| Ex. N. | Structure (a) glycol type | mol. % | glicol type | mol. % | N. OH (b) | Mn | m.p. (°C.) (c) | Tg (°C.) (c) | T$_c$ (°C.) (c) | ΔH$_c$ J/g (c) | Viscosity cps × 10$^3$ +70 | +90 | +100 |
|---|---|---|---|---|---|---|---|---|---|---|---|---|---|
| 1 | DDD | 50.6 | HD | 49.4 | 28.2 | 3976 | 50.7 | −58.0 | 34.6 | 102 | 18.5 | 8.11 | 4.14 |
| 2 | DDD | 51 | HD | 49 | 33 | 3122 | 46.2 | | 31.6 | 75 | 8.95 | 3.98 | 2.0 |
| 3 | DD | 74 | HD | 26 | 37.1 | 3020 | 49.3 | −42.1 | 32.4 | 77.1 | 6.15 | 2.9 | 1.55 |
| 4 | DD | 79 | HD | 21 | 28.9 | 3886 | 51.10 | −48.0 | 33.5 | 90 | 11.27 | 5.19 | 2.71 |
| 5 | ND | 90.5 | HD | 9.5 | 31.76 | 3530 | 51.3 | −40.0 | 31.1 | 77.1 | 11.2 | 5.08 | 2.56 |
| 6 | DDD | 70 | CL | 30 | 30 | 3740 | 51.1 | | 36.2 | 110 | n.d. | | |
| 7 | DDD | 100 | — | | 36.19 | 3100 | 66.9 | | 47 | 125 | n.d. | | |

TABLE 1-continued

| Ex. N. | Structure (a) glycol type | mol. % | glicol type | mol. % | N. OH (b) | Mn | m.p. (°C.) (c) | Tg (°C.) (c) | T_c (°C.) (c) | ΔH_c J/g (c) | Viscosity cps × 10³ +70 | +90 | +100 |
|---|---|---|---|---|---|---|---|---|---|---|---|---|---|
| 8 | DD | 100 | — | | 33 | 3400 | 58 | | | 105 | n.d. | | n.d. |

(a) DDD = 1,12 dodecandiol; DD = 1,10 decandiol; ND = 1,9 nonandiol; HD = 1,6 hexandiol; CL = caprolactone;
(b) ASTM - D 2849, Method A;
(c) DSC, 10° C./minute during heating and cooling; m.p. = melting point; Tg = glass transition temperature; $T_c$ = cystallization temperature; $\Delta H_c$ = crystallization enthalpy

TABLE 2

| Ex. N. | Polyol of ex. N. | g | mmol | MDI g | mmol | NCO OH molar | m.p. °C. | $T_c$ °C. | $\Delta H_c$ (J/g) | °C. | Viscosity cps × 10³ |
|---|---|---|---|---|---|---|---|---|---|---|---|
| 9 | 2 | as described | | | | 2.2 | 42.9 | 22.5 | 51.8 | 80 | 100 |
| 10 | 2 | 101.8 | 32.60 | 15.3 | 61.95 | 1.9 | 42.5 | 20.6 | 51.2 | 80 | 200 |
| 11 | 1 | 110 | 27.67 | 15.0 | 60.86 | 2.2 | 45.1 | 27 | 53.8 | 80 | 110 |
| 12 | 3 | 110 | 36.4 | 19.72 | 80.08 | 2.2 | 45.0 | 20 | 38 | 80 | 36 |
| 13 | 4 | 110 | 28.31 | 15.34 | 62.27 | 2.2 | 44.3 | 20.6 | 36.7 | 80 | 65 |
| 14 | 5 | 110 | 31.14 | 16.87 | 68.51 | 2.2 | 44.3 | 17.1 | 37.2 | 80 | 71 |

MDI = diphenylmethanediisocyanate
$T_c$ = crystallization temperature
$\Delta H_c$ = crystallization enthalpy
m.p. = melting point

TABLE 3

| Example Number | NCO terminated prepolymer of Table 2 (Ex. Number) | Yield kg/cm² | Tensile strength 100% kg/cm² | Secant modulus 100% kg/cm² | Secant modulus 200% kg/cm² | Def. % |
|---|---|---|---|---|---|---|
| 18 | 9 | 115 | 432 | 100 | 54.6 | 1900 |
| 19 | 10 | 100 | 460 | 80 | 43.7 | 1900 |
| 20 | 11 | 103 | 425 | 103 | 84.5 | 2200 |
| 21 | 12 | 150 | 358 | 99.5 | 51 | 1880 |
| 22 | 13 | 121 | 384 | 85 | 44 | 2250 |
| 23 | 14 | 118 | 460 | 89 | 46 | 2110 |
| 24 | 15 | 156 | 396 | 142 | 73.2 | 1400 |
| 25 | 16 | 203 | 393 | 195 | 101 | 1000 |

TABLE 4

| Example number of table 3 | 30 days yield (kg/cm²) | 30 days B.L. (kg/cm²) | 30 days Mod. 100% | 30 days Def. % | 60 days B.L. (kg/cm²) | 60 days Mod. 100% (kg/cm²) | 60 days Def. % | 90 days B.L. (kg/cm²) | 90 days Mod. 100% (kg/cm²) | 90 days Def. % |
|---|---|---|---|---|---|---|---|---|---|---|
| 18 | — | | | | 460 | 40.3 | 1600 | 580 | 290 | 1400 |
| 19 | — | | | | 457 | 33.5 | 1400 | 580 | 32.6 | 1400 |
| 20 | — | 51.65 | 39.5 | 1630 | 570 | 38.4 | 1600 | 570 | 46 | 1600 |
| 21 | — | 526 | 38 | 1650 | 490 | 39 | 1660 | n.d. | — | — |
| 22 | — | 555 | 58 | 1780 | 546 | 49 | 1850 | 580 | 50 | 1850 |
| 23 | — | 496.8 | 24.7 | 1580 | 467 | 67 | 1550 | 487 | 47 | 1450 |
| 24 | | | | | 492 | 117 | 1060 | 540 | 129 | 1130 |
| 25 | | | | | 425 | 172 | 725 | 437 | 197 | 670 |
| 26 (a) | — | 7.1 | 12 | 150 | not determinable | | | | | |
| 27 (b) | — | 6.3 | 15.1 | 120 | degraded | | | | | |

(a) The sample, before hydrolysis, had the following properties: B.L. 210 kg/cm², elongation (%) 1000, yield 136 kg/cm², Modulus 100% = 85;
(b) The sample, before hydrolysis, had the following properties: B.L. 195 kg/cm², elongation (%) 870, Modulus 100% = 80;

TABLE 5

| Ex. N. | Plyol of ex. N. | g | mmol | MDI g | mmol | NCO OH (molar) | R H—N(CH₂)₃Si(OCH₃)₃ g | mmol | $T_m$ °C. | $T_c$ °C. | $\Delta H_c$ J/g | η cps × 10³ +100° C. |
|---|---|---|---|---|---|---|---|---|---|---|---|---|
| 29 | 1 | 110 | 27.66 | 15 | 121.8 | 2.2 | 20.4 | 66.4 | 45.3 | 9.3 | 47 | 1000 |
| 30 | 5 | 110 | 31.14 | 16.9 | 137.23 | 2.2 | 22.4 | 75.2 | 39.9 | 2.3 | 45 | n.d. |
| 31 | 4 | 110 | 28.3 | 15.33 | 124.52 | 2.2 | 20.85 | 67.92 | 39.4 | 8.5 | 47 | n.d. |
| 32* | 1 | 110 | 27.66 | 15 | 121.8 | 2.2 | 20.4 | 66.4 | 43.5 | 20.5 | 50 | n.d. |

*In this case the sulphobenzoic acid was substituted with tosylisocyanate in the same quantity.

TABLE 6

| Example Number | Si(OCH$_3$)$_3$-terminated prepolymer of table 5 (Ex. N.) | Yield | Tensile strength (kg/cm$^2$) | Secant modulus 100% (kg/cm$^2$) | Secant modulus 200% (kg/cm$^2$) | Elongation % |
|---|---|---|---|---|---|---|
| 33 | 29 | Badly defined | 229 | 130 | 85 | 322 |
| 34 | 30 | Badly defined | 202 | 113 | 61 | 546 |
| 35 | 31 | Badly defined | 264 | 119 | 82.4 | 382 |
| 36 | 32* | Badly defined | 189 | 106 | 60.6 | 465 |

*see Table 5

We claim:

1. A diol-terminated polycarbonate having the formula (I):

HO—(R$_1$—O—CO—O)$_x$—(R$_2$—O—CO—O)$_y$—R$_3$OH wherein the succession of radicals —R$_1$—O—CO—O— and —R$_2$—O—CO—O— inside the copolymer is purely random; R$_1$ is a polymethylene radical containing from 9 to 12 carbon atoms, or combinations thereof; R$_2$ is a bivalent radical derived by the loss of the two hydroxyl groups from a diol selected from the group consisting of 1,4-butandiol, 2,2-dimethyl-1,3-propandiol, 1,5-pentandiol, 1,6-hexandiol, 1,4bishydroxymethylcyclohexane, triethyleneglycol and the diol derived by the condensation of caprolactone with 1,6l -hexandiol; R$_3$ is a bivalent radical which is R$_1$ or R$_2$, and x and y have such values that:
 (a) the fraction of the structural units corresponding to: —(R$_1$—OCO—O)$_x$— is from 50 to 95% by weight of the entire copolymer; and
 (b) the number molecular weight (MW) of the polycarbonate diol having formula (I) ranges from 1500 to 15,000.

2. The diol-terminated polycarbonate of claim 1, wherein the molecular weight of the polycarbonate ranges from 2000 to 8000.

3. The diol-terminated polycarbonate of claim 1, wherein the crystallization temperature (Tc) ranges from +20° C. to +45° C.

4. The diol-terminated polycarbonate of claim 1, wherein the polycarbonate has a melting temperature (T$_m$) of between +40° and +70° C.

5. The diol-terminated polycarbonate of claim 1, wherein the polycarbonate has a content of alpha-omega-diol of 50 to 95% by weight (35-95 mole %) based on the total weight of the polycarbonate.

6. The diol-terminated polycarbonate of claim 1, wherein the polycarbonate has a (F$_{OH}$) hydroxyl function of 2.

7. The diol-terminated polycarbonate of claim 1, wherein the polycarbonate has a glass transition temperature (Tg) ranging from −40° C. to −60° C.

8. The diol-terminated polycarbonate of claim 1, wherein the polycarbonate has a crystallization enthalpy of 50 to 110 J/g.

9. The diol-terminated polycarbonate of claim 1, wherein R$_1$ is a single alkylenic radical and R$_2$ is a single bivalent radical, each of R$_1$ and R$_2$ being randomly distributed inside the macromolecule.

10. A method of preparing the polycarbonate diol of claim 1, which comprises: transesterifying an organic carbonate with a mixture of diols HO-R$_1$—OH and HO—R$_2$—OH, wherein R$_1$ and R$_2$ are as defined above.

11. The process of claim 10, wherein the molar ratio of diols to organic carbonate ranges from 1.03 to 1.3, and wherein the transesterification reaction is conducted at a temperature ranging from 80° to 200° C. for a period of time of 4 to 10 hours, said process resulting in the formation of alcohol, glycol or phenolic by-products.

* * * * *